United States Patent [19]
Montalbano

[11] Patent Number: 5,918,237
[45] Date of Patent: Jun. 29, 1999

[54] SYSTEM AND METHOD FOR PROVIDING MULTIMEDIA BOOKMARKS FOR HYPERTEXT MARKUP LANGUAGE FILES

[75] Inventor: John Richard Montalbano, Carmel, Ind.

[73] Assignee: AT&T Corp., Middletown, N.J.

[21] Appl. No.: 08/724,696

[22] Filed: Sep. 30, 1996

[51] Int. Cl.[6] .................................................... G06F 17/21
[52] U.S. Cl. ......................................... 707/513; 345/302
[58] Field of Search .............................. 707/513; 345/302

[56] References Cited

PUBLICATIONS

Access Net Resources Directly From finder. "T.H.E. Journal." vol. 23, No. 8, p. 46 [p. 12], Mar. 1996.
Ayre, Rick. "The Wollongong Group, Inc.: Emissary." Mar. 12, 1996. Document on–line. Available from wysiwyg://43http://wwww.zdnet.com/pcmag/issues/1505/pcm00041.htm; Internet; accessed Oct. 6, 1998. pp. 1–2.
Inline Images: External Images, Sounds, and Animations. "A Beginner's Guide to HTML." Apr. 1996. document on–line. Available from htp://www.physics.iastate.edu//numaps/96/references/htmlprimer.html; Internet; accessed Aug. 10, 1997. pp. 16–20.
Tittel, Ed and Steve James. "HTML for Dummies" 2d ed. (Foster City: IDG Books Worldwide, Inc. 1996) pp. 27–35, 100–102, 157 & 213–231, 1996.

*Primary Examiner*—Joseph H. Feild
*Assistant Examiner*—John L. Young

[57] ABSTRACT

A system and method provide a multimedia bookmark for a hypertext markup language file that has Universal Resource Locator (URL). A user wishing to later revisit a presently loaded and displayed HTML file requests the browser to store a bookmark. The browser scans the HTML file for a keyword. If the keyword is detected, the browser locates a description of the location of a multimedia bookmark data (MBD) file that is disposed at a predetermined position in the HTML file in relation to the keyword. The browser stores the MBD file with the URL as a multimedia bookmark. If the browser does not find a keyword, it scans the HTML document for TITLE information. If detected, the TITLE information is stored with the URL as a traditional, text-only bookmark. The user recalls his list of bookmarks to revisit the HTML file, and is presented with a set of multimedia bookmark representations (MBRs) generated from the stored MBDs, as well as text-only bookmarks. The browser may change the appearance of, animate, or present audio accompaniment to an MBR when the user places his cursor over or selects the MBR. Upon selecting a MBR or text-only bookmark, the browser loads and displays the HTML file at the associated URL.

37 Claims, 7 Drawing Sheets

PRIOR ART

FIG. 3

PRIOR ART

SYSTEM AND METHOD FOR PROVIDING MULTIMEDIA BOOKMARKS FOR HYPERTEXT MARKUP LANGUAGE FILES

FIELD OF THE INVENTION

This invention relates to bookmarks for hypertext markup language (HTML) files, and particularly to a system and method for associating a multimedia bookmark representation (MBR) with graphics, video, sound or text data, or a combination thereof, with a Universal Resource Locator (URL) that refers to the location of a Hypertext Markup Language (HTML) file.

BACKGROUND OF THE INVENTION

Hypertext Markup Language (HTML) was developed to allow users on the Internet to easily navigate from within one file to another file, the other file possibly residing on another computer hundreds or thousands of miles away. A user selects, loads and displays HTML files utilizing software called a browser.

An HTML file is located at an address represented by a Universal Resource Locator (URL), and may reside on a user's own computer, or on another computer networked with the user's computer. In particular, the HTML file may reside on a networked computer with an Internet address, called a host. A logical grouping of HTML files on a given host is known as a website. All websites taken together constitute the World Wide Web (WWW).

HTML files displayed by a browser generally contain areas that, when selected by a user, cause the browser to load and display other HTML files. A selectable area (known as a link) may be textual, graphic, or generally any designated area of a displayed HTML file. Each link is associated with a URL of a destination HTML file, which is loaded and displayed when the link is selected by the user.

Almost every website HTML file contains links to other files, many of which reside at different websites. Practically any number of files across numerous hosts may be retrieved without repetition merely by continuing to select interesting links from one website to another. The Internet may thus be explored opportunistically, in a practice known in the art as "surfing." However, the size and richness of the Internet makes it unlikely that a user could find the same website again without assistance. Thus, if a user finds an interesting website HTML file worth revisiting, the user needs a convenient, easy and effective way of storing the address, retrieving the address, associating the address with the content of the website or website file, and loading and displaying the HTML file at the address.

Committing to memory the URL of a favorite site is often difficult, and recording or storing the URL alone is generally insufficient because the URL is generally not suggestive of the content of a website. For example, the URL for a website file at which a user may shop for books is http:\\www.amazon.com\exec\obidos\subst\index2.html\21-802700409-30065. This is almost impossible to remember, is tedious to enter directly, and is hardly suggestive of a bookseller.

A partial solution to this problem has been to associate a brief, easy to remember textual description with the underlying URL. This textual description is embedded in the HTML file between TITLE headers. In the case of the bookseller, the HTML file at the URL given above contains the line <TITLE>Amazon.com Books! Earth's Biggest Bookstore.<\TITLE>. At the user's request, the browser associates the URL with the TITLE information of a presently displayed HTML file and stores this data as a bookmark. The bookmark is stored in a bookmark file, which is usually resident on the user's computer. At the user's request, a list of the textual descriptions in the bookmark file is displayed as a bookmark list. Upon selecting one such description, the browser loads and displays the HTML file found at the associated URL. In this way, the user may remember and return to previously visited websites whose address the user asked the browser to remember.

Although the use of textual TITLE information is generally more suggestive of the content of an HTML file than the file's URL, such information can be confusing and incomplete. For example, the TITLE information to be used as a bookmark for the Website at http:\\www.att.com\business\gsds\index.html is "AT&T GSDS." This conveys the information that the site is affiliated with AT&T, but its content remains obscured behind a potentially unfamiliar acronym (the site actually provides information relating to AT&T Global Switched Digital Services.)

Likewise, some TITLE data is too long to be displayed textually in its entirety and has to be truncated. This may produce a textual bookmark of little value to the user. For example, the bookmark for one HTML file is displayed on one Browser as "U.S. House of Represe . . . lations (searchable)." This conveys little useful information about the content of the file because it is too long, and had to be truncated by the browser.

Figure 1:
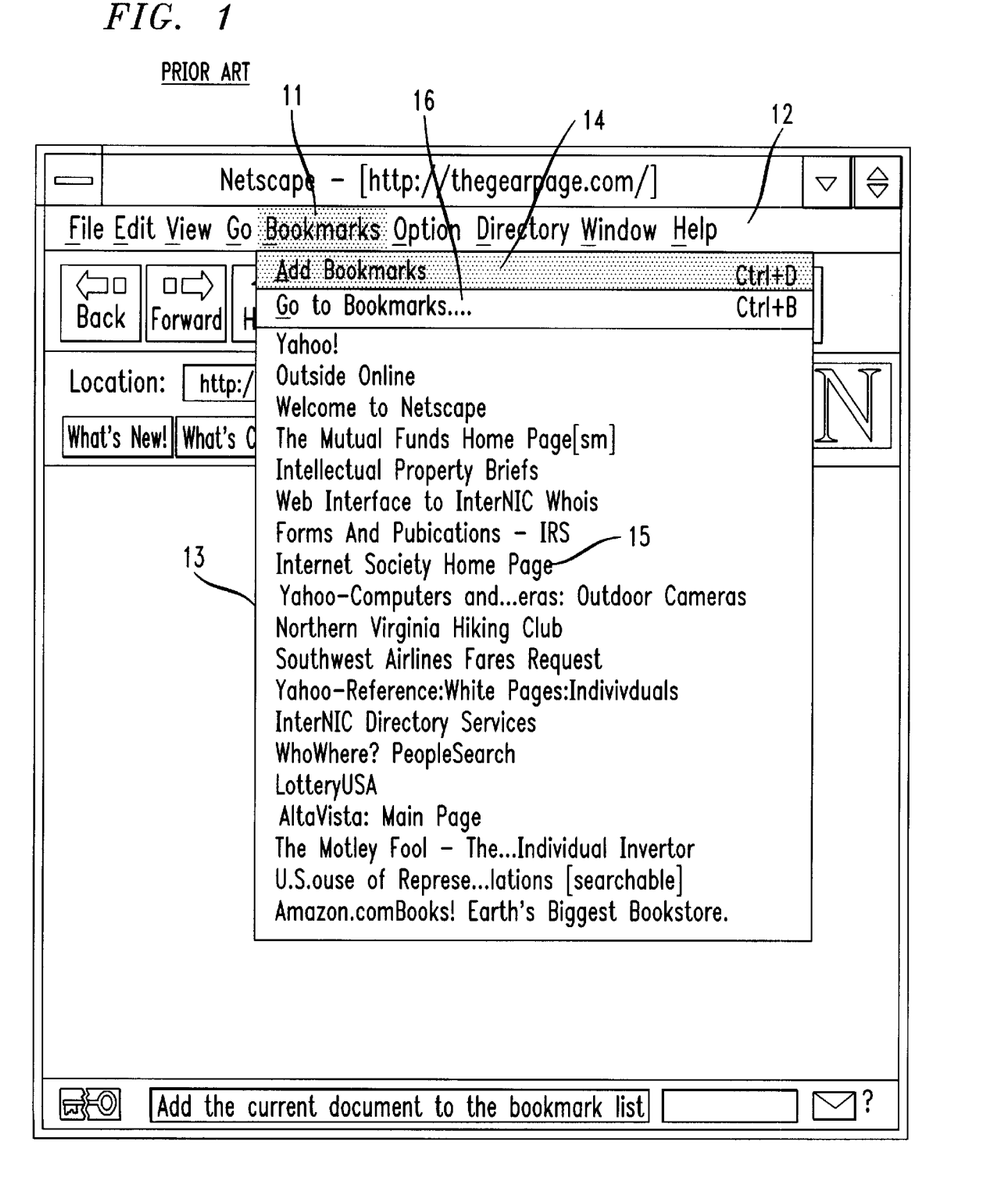
FIG. 1 depicts a prior art embodiment of a bookmark feature in a known browser.

FIG. 1 depicts a prior art embodiment of the bookmark feature as implemented in the Netscape 2.0 Browser developed by Netscape Communications, Inc. In order to store a bookmark for the presently displayed HTML file, the user utilizes his mouse to position the cursor over the word Bookmarks 11 in the title bar 12. Upon clicking the left mouse button, the bookmarks window 13 appears. The user then places the cursor over the words Add Bookmark 14 in the bookmarks window 13, clicks the left mouse button. The browser scans the HTML file for TITLE information, which is embedded in the HTML file between TITLE headers as follows:

<TITLE>Internet Society Home Page<\TITLE>

When the user directs the browser to save a bookmark, the browser adds "Internet Society Home Page"; 15 to the bookmarks window 13 and associates this TITLE information with the URL specifying the location of the HTML page. In the present example, the bookmark could be represented as the ordered pair, ("Internet Society Home Page", http:\\www.isoc.org). This is stored in a bookmark file.

Figure 2:
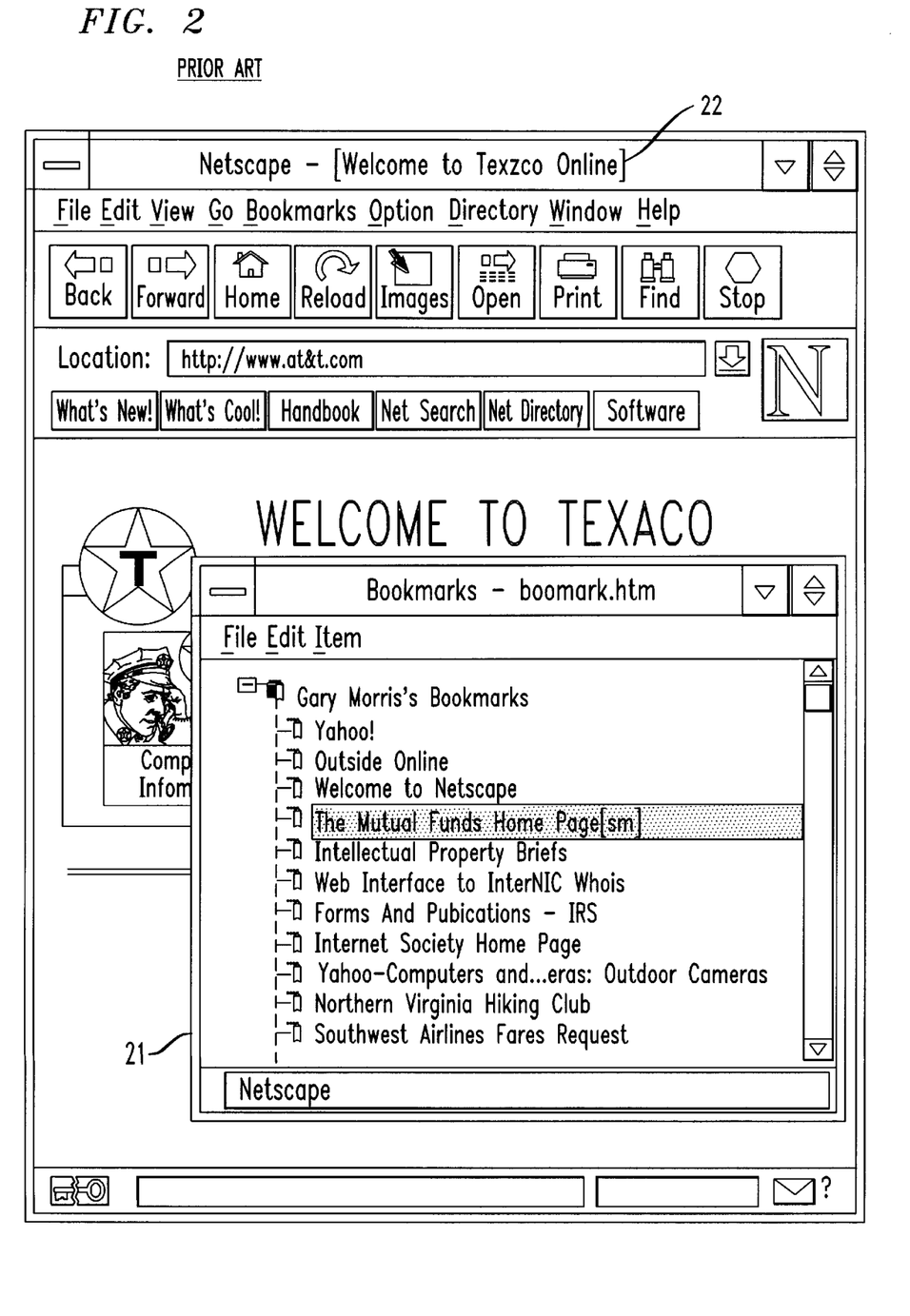
FIG. 2 depicts another prior art embodiment of a bookmark feature in a known browser.

FIG. 2 depicts another prior art embodiment of the bookmarks window 21 in the Netscape 2.0 Browser. Bookmarks window 21 displays bookmarks that are stored after the bookmarks window 13 of FIG. 1 is full. The bookmarks are added one at a time in a manner identical to that described above for FIG. 1. It should also be noted that the text between the TITLE headers of a page is used to present a descriptive title 22 to the user when the page is displayed. Thus, the "Welcome to Texaco" page at http:\\www.texaco.com\ displayed in FIG. 2 comprises the HTML code:

<TITLE>Welcome to Texaco Online<\TITLE>

In other words, the same text used for the page's bookmark in the bookmarks window 21 is used as the descriptive title 22 displayed at the top of the page when the page is displayed to the user.

Figure 3:
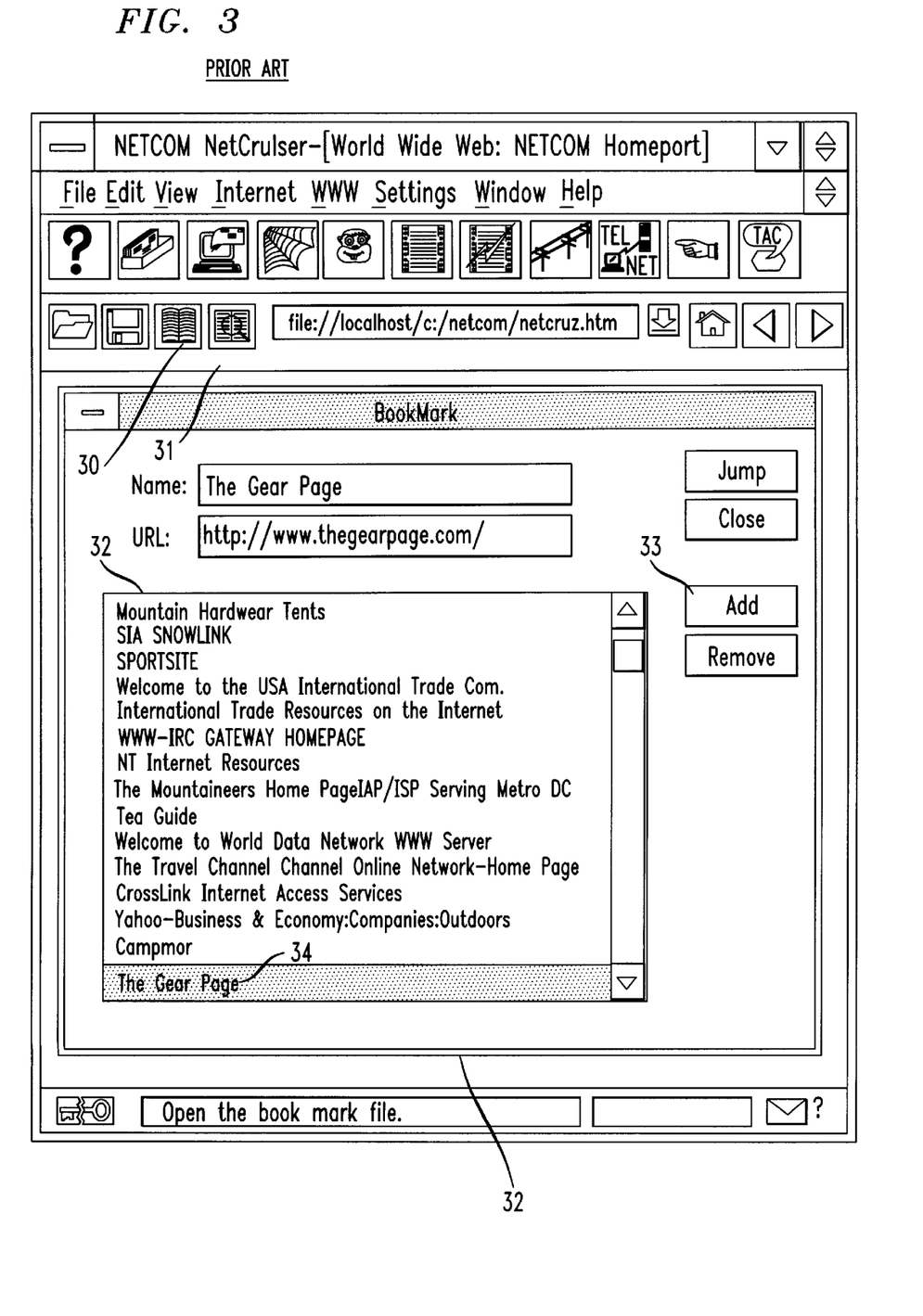
FIG. 3 depicts a prior art embodiment of a bookmark feature of another known browser.

FIG. 3 shows an embodiment of a bookmarks list as implemented by the NetCruiser browser developed by Netcom, Inc. In order to store a bookmark for the presently displayed HTML file, a user selects the "open book" graphic 30 on the control bar 31. The bookmarks window 32 appears, and the user selects the Add button 33. The TITLE 34 of the presently displayed HTML file is then added to the bookmarks window 32. As with the Netscape browser, the URL of the HTML file is associated with the TITLE information and is stored in a bookmark file.

To retrieve an HTML file whose TITLE is listed in the bookmarks list in FIG. 1, the user again selects the word Bookmarks 11 in the title bar 12 of the browser. The user then selects the TITLE 15 of the HTML page sought to be loaded, whereupon the bookmarks window 13 disappears and the HTML file is loaded and displayed. The file may be loaded from a cache, or downloaded over a network from another computer or a host.

Figure 3A:
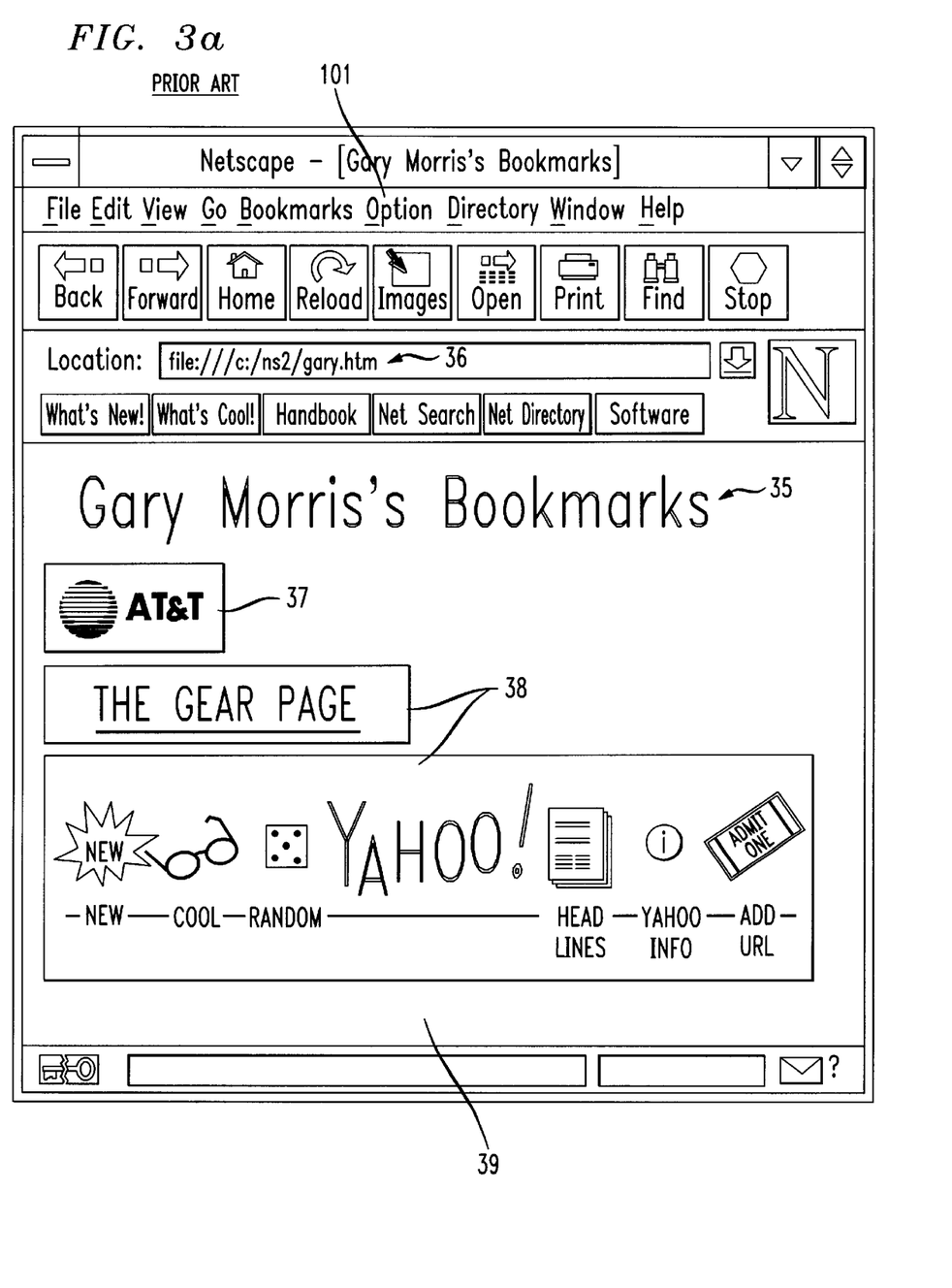
FIG. 3a depicts another known bookmark feature of a known browser.

FIG. 3a shows another known method of storing bookmarks. The user first accesses the Options menu 101 to specify a bookmarks HTML file that the browser is to load automatically when the browser is first activated by the user and when the user requests his bookmarks. The browser designates this user bookmark file as the user bookmark page. An example of such a page 39 is shown in FIG. 3a. The page 39 appears with a header 35 that include's the user's name, and the user bookmark file name 36 (gary.htm) of the page 39 is displayed.

The author of a page can cause an image to be downloaded as a bookmark when a user with a bookmark page saves the author's page as a bookmark. This is carried out by replacing the descriptive text between the TITLE headers of an HTML file with an image source header. For example:

<TITLE>
<IMG SRC="http:\\www.att.com\images\attlogo.gif">
<\TITLE>

This is disadvantageous because when a bookmark is saved for such a page by a user without a bookmark page, it is the cryptic text between the TITLE headers that is stored in the user's bookmark list 13 (FIG. 1). In other words, the text:

<IMG SRC="http:\\www.att.com\images\attlogo.gif"> would appear in the user's bookmark list instead of the text "ATT's Home Page."

Another disadvantage of replacing descriptive text between TITLE headers with an IMG SRC header is that the cryptic, non-descriptive IMG SRC header will appear as the title of the page (in the position of title 22 of FIG. 2), rather than a descriptive line of text. Thus, a user is not shown the intended topic of a displayed page, and must derive its relevance as best he can from the content of the page itself.

Once the author replaces the descriptive text between the TITLE headers with the IMG SRC header, the user loads and displays the page and selects Bookmarks 11 in the title bar 12 of FIG. 1. The user then selects Add Bookmark 14, whereupon the text "http:\\www.att.com\images\attlogo.gif" is added as a line of text to the bookmarks window 13, as discussed above, which then disappears. The URL "http:\\www.att.com" is associated with this bookmark and is stored invisibly.

Next, the user again selects Bookmarks 11, and selects Go To Bookmarks 16. The user then saves the bookmarks file to the user bookmark file, for example, to gary.htm.

When the user displays his user bookmark page 39 (FIG. 3a), the browser contacts the computer at http:\\www.att.com and downloads the image 37 stored at the address between the title headers. This image 37 is then displayed on the user bookmark page 39. For example, when the user displays the file gary.htm, the browser downloads the image attlogo.gif 37 (FIG. 3a) from the computer at the address http:\\www.att.com. As previously mentioned, this image is associated with the URL of the page from which it was stored, i.e., the page on which the image source appeared between TITLE headers. When the image 37 is selected, the page with the associated URL is loaded and displayed. Thus, when the user selects the AT&T logo 37, the page at "http:\\www.att.com\" is loaded and displayed to the user. When selected, the other two graphics 38 cause the browser to load and display the pages at their respective associated URLs.

This system is disadvantageous because it is complex, requires many steps, and fails to store the image it downloads as a bookmark in a way that it can be easily and readily accessed from browser session to browser session. Rather, it only stores the image source address and associated URL of each graphic bookmark from session to session. Thus, each time the user starts his browser, the browser must seek out each and every server with a page containing an image bookmark, and then download the graphic so that it can be displayed on the user's bookmark page. This is a slow, tedious process that can fail when images are unavailable because of failed links or broken servers.

This system is also disadvantageous because the text displayed in a the bookmarks window is only a cryptic image source address, lending no description of the bookmarked page. Finally, this system can only store bookmarks as static graphic images or text.

A better, more convenient way of storing and presenting bookmarks comprising at least one of textual, graphic, animation, video and audio media would be simple, being no more complex than the present system of adding a textual bookmark. It would preserve the ability to retain descriptive information for the title of a displayed page. The multimedia bookmarks would be stored from browser session to browser session on the user's computer, and would not have to be loaded from other computers through a network each time the user starts his browser or requests his bookmarks.

SUMMARY OF THE INVENTION

The present invention provides a system and method for providing multimedia bookmarks for HTML files. The files may reside on a single computer, on a network of computers, or on an internetwork of computers, such as the Internet.

In accordance with the present invention, a keyword is embedded in an HTML document that has a URL. The keyword signals the presence of data in the HTML file that describes the location of multimedia bookmark description (MBD) information. MBD information may reside in a single file or several files. This location data is disposed in a predetermined position relative to the location of the keyword in the HTML file. The MBD information is generally stored on the same computer as the HTML document in which its location is embedded, but can also be stored on one or more other networked computers or hosts to which the browser has access.

The browser first loads and displays the HTML file containing the keyword and MBD location data. When the user directs the browser to save the location of the file as a bookmark, the browser scans the HTML file for the keyword and TITLE information. If the browser finds the keyword, it determines the location of the MBD information and stores the MBD information with the URL of the HTML file as a bookmark. If the browser cannot find the keyword, it stores the TITLE information along with the file's URL as a traditional bookmark.

When the user later directs the browser to display its list of bookmarks, the browser displays multimedia bookmark representations (MBRs) derived from the MBD information of stored bookmarks, as well as any traditional text-only bookmarks that have been stored. The MBRs include one or more of static graphic, animated graphic, video, audio and text components. When the user places his cursor over a multimedia bookmark, the browser may play audio data, animate a static graphic MBR, or change the MBR altogether. Upon selecting the multimedia representation, the browser may play audio data from the MBD information while the requested HTML page loads.

Textual data to serve as a descriptive title for a displayed page can reside in the MBD, or else occur elsewhere in the HTML page. When the HTML page is loaded the descriptive textual data is extracted and displayed as the title of a page.

DETAILED DESCRIPTION

The present invention provides a system and method for storing, retrieving and displaying textual, graphic, animated graphic, video and audio information as bookmarks. In accordance with the present invention, a file is stored if it is recorded in a persistent fashion, meaning the file is recorded in a way that allows it to persist from session to session. i.e., is available to the user computer without having to retrieve it again from the remote computer from which it originated. An example of storing a file is to write it to a hard disk. Another example is to write it to persistent random access memory such as Flash memory.

In further accordance with the present invention, a keyword is embedded in an HTML file. The keyword signals the presence of data in the HTML file that describes the location of a multimedia bookmark data (MBD) information. This location data is disposed in a predetermined position relative to location of the keyword in the HTML file. The MBD information is generally stored on the same computer as the HTML document in which its location is embedded, but can also be stored on one or more networked computers or hosts to which the user has access.

In one embodiment, the keyword and MBD location information is embedded in an HTML comment header:

<!KEYWORD media\logos\attwonder.wrl>

When the user makes a bookmark request, the browser scans the HTML file for the KEYWORD, and then considers the ensuing string of non-space ASCII characters until the end of the comment line (not including the final ">") to be the MBD location data. The MBD information is downloaded by the browser and stored with the URL of the HTML file as a multimedia bookmark. The MBD information may be stored as a single file or a group of files. The file extension (in this case, "wrl") can be used to signify one of many possible formats of multimedia data. In this way, the present invention differentiates between and accommodates more than one MBD file format.

In another embodiment, the MBD location data is a URL:

<!KEYWORD http:\\www.att.com\media\logos\attwonder.wrl>

After scanning the HTML file and finding KEYWORD, the browser downloads a MBD file from a remote host at http:\\www.att.com\media\logos\attwonder.wrl. The MBD file and the URL are then stored as a multimedia bookmark in such a way that the multimedia bookmark need not downloaded again for each new browser session. The bookmark may thus be saved in a single step, as opposed to the two-step process required by the known method of generating graphic bookmarks described above.

In another embodiment, an HTML MBD header is embedded in the HTML file to indicate the MBD location data:

<MBD>media\logos\attwonder.wrl<\MBD>

The browser scans the HTML file for the HTML header <MBD>, and identifies the text between <MBD> and <\MBD> as MBD location data. The browser then stores the MBD information with the URL when the user makes a bookmark request. The MBD information may reside on the same computer as the user, in which case it would merely have to be stored. However, the MBD information generally resides on one or more different networked computers, and must be downloaded before it is stored. In accordance with the present invention, the MBD information need only be downloaded once. Thereafter, the browser has access to this information without having to download it again from a remote computer through a network. Further, the user saves the bookmark in a single step.

The MBD information may consist of a graphic file:

<MBD><IMG SRC= "media\logos\attwonder.gif><\MBD>

Figure 4:
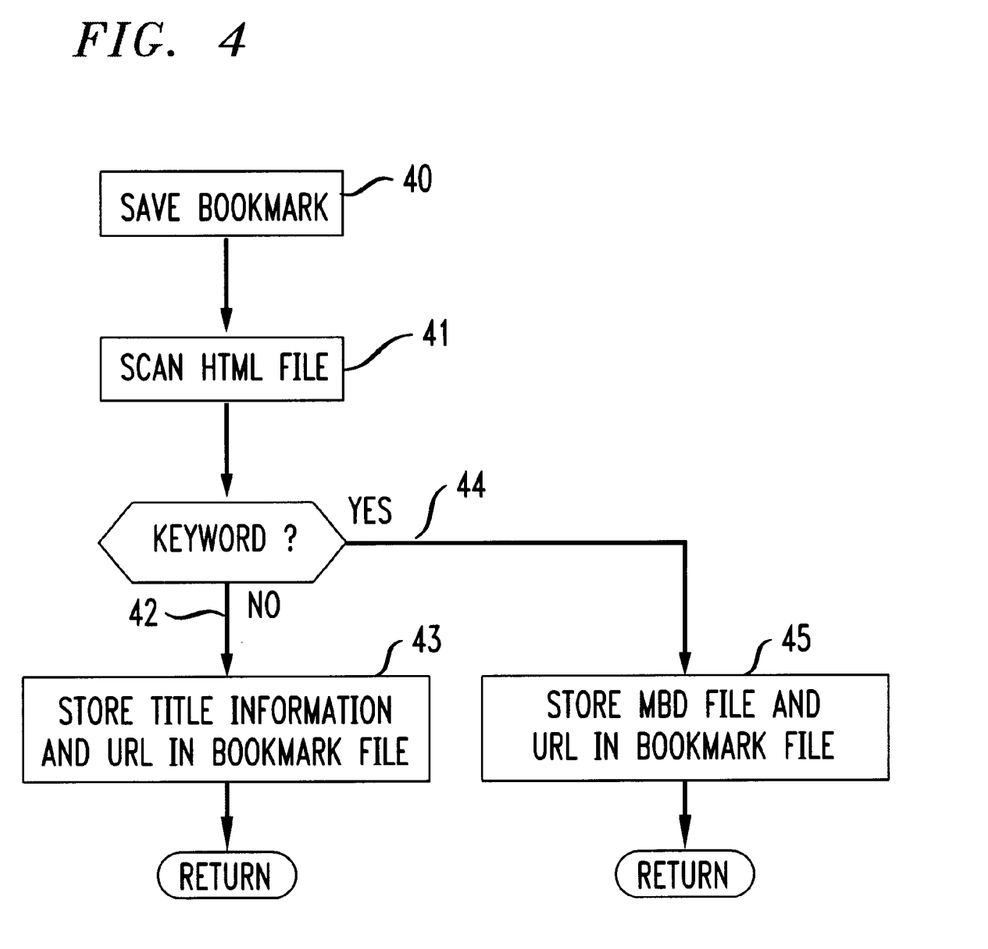
FIG. 4 is a flow chart showing the steps of saving a bookmark in accordance with the present invention.

A flow chart showing the steps of providing a bookmark for an HTML file in accordance with the present invention is shown in FIG. 4. First, the user selects the option to save a bookmark 40 for the presently loaded HTML file. The browser scans the HTML file 41 for the KEYWORD. If the KEYWORD is not found 42, the browser stores TITLE information and the URL in a traditional, text-only bookmark 43, and then returns the user to the browser. If the KEYWORD is found 44, then the browser downloads and stores the MBD information and the URL as a multimedia bookmark. This information is stored locally, such as on the user computer's local hard disk drive.

When the user selects the option to view his bookmarks, multimedia bookmark representations (MBR) are generated from the one or more MBD files stored as bookmarks. There is no need to again download the MBD data from the remote computer from which it originally came. The MBR is a representation of the bookmark in least one of graphic, video, audio, and textual forms, and is generated from the MBD and presented to the user. The relationship between the multimedia bookmark, MBD and MBR is shown in FIG. 5.

Figure 5:
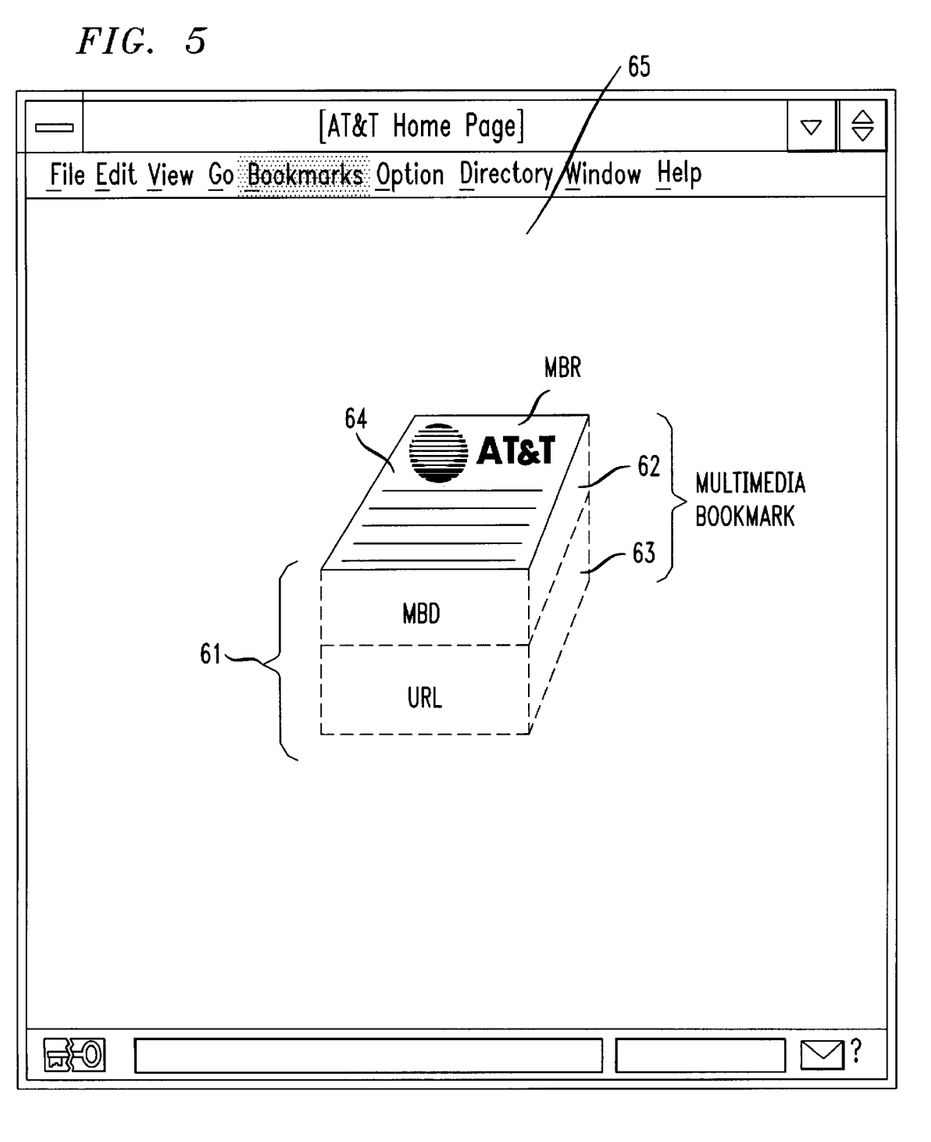
FIG. 5 depicts the relationship between a multimedia bookmark, multimedia bookmark data information, a Universal Resource Locator, and a multimedia bookmark representation.

In the embodiment shown in FIG. 5, the multimedia bookmark 61 is comprised of a MBD file 62 and a URL 63. When a user requests to the browser to display his bookmarks, it generates a MBR 64 from the MBD 62 and displays the MBR 64 on the display 65. In this embodiment, the MBR 64 is a graphic of the AT&T logo. When the user selects the logo on the display, the browser generates audio from the MBD, producing a voice which says, "Thank you for choosing AT&T." In a like manner, other embodiments may cause the MBR to change appearance, animate, or show video when selected, or when the user places his cursor over the displayed MBR.

Figure 6:
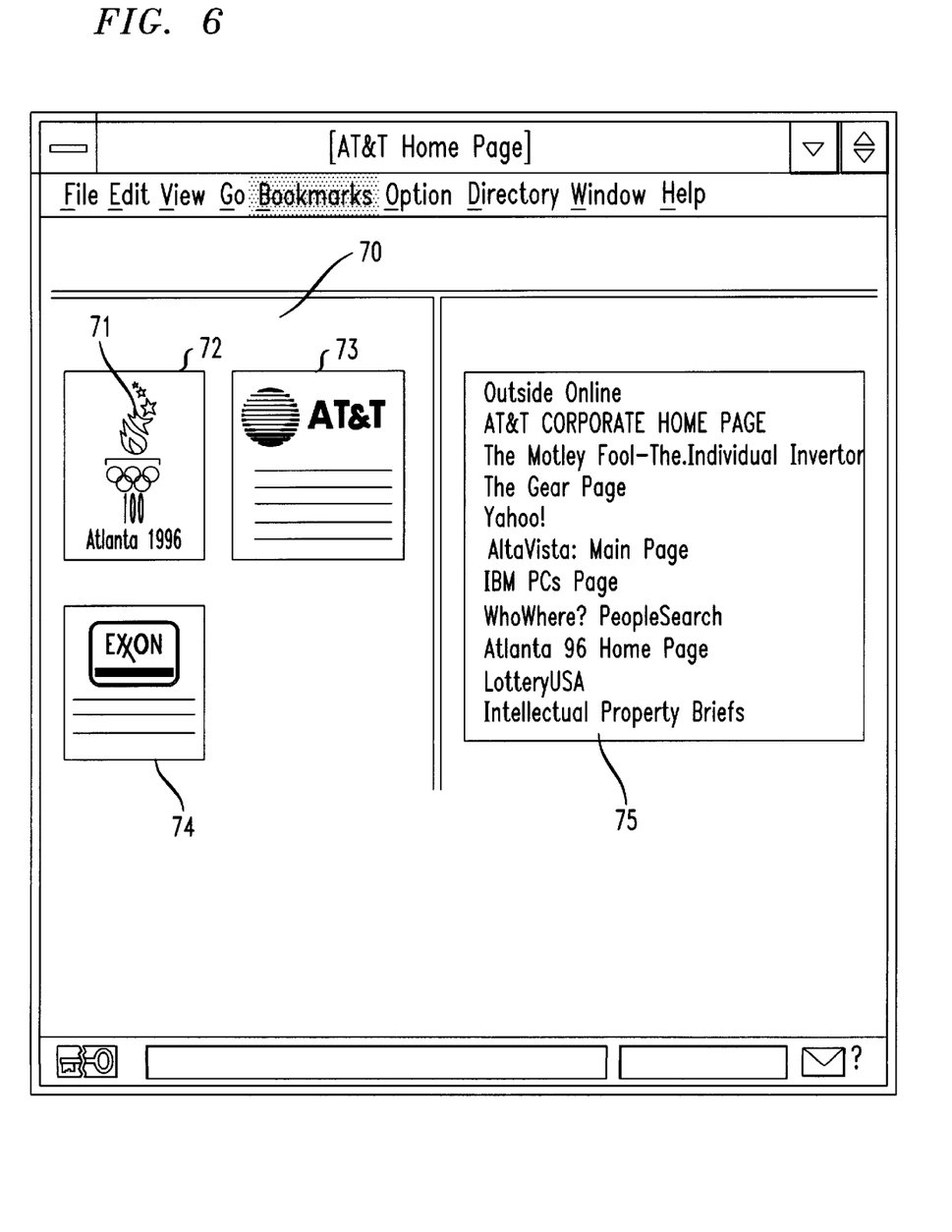
FIG. 6 depicts one embodiment of a screen displaying bookmarks in accordance with the present invention.

An example of a bookmarks display in accordance with the present invention is shown in FIG. 6. In this embodiment, the left side of the screen 70 shows the MBRs of the multimedia bookmarks. In this embodiment, the flame of the Olympic torch 71 in the Atlanta '96 MBR 72 appears to be burning. This is carried out by animation or video. When the user selects the AT&T MBR 73, a voice is heard to say "Thank you for choosing AT&T," and the AT&T HTML file at the underlying URL is loaded and displayed. When the user places his cursor over the FuelCorp MBR 74, the bookmark dissolves to a video clip of a pouncing tiger, and a voice is heard to say, "FuelCorp Super 100 reduces engine wear by thirty five percent. Click here to find out more." The right side of the screen shows a list of traditional text-only bookmarks 75.

When a user selects any MBR or text-only bookmark, the browser loads and displays the HTML file at the associated URL.

What is claimed is:

1. A system for providing multimedia bookmarks for Hypertext Markup Language files, comprising a computer having:
   a. an HTML file associated with a Universal Resource Locator (URL);
   b. at least one multimedia bookmark data (MBD) file associated with said HTML file stored on said computer;
   c. a KEYWORD embedded in said HTML file;
   d. a description of the location of said MBD file, said description disposed in a predetermined position relative to the position of said KEYWORD.

2. The system of claim 1, wherein said MBD file is comprised of graphic data.

3. The system of claim 1, wherein said MBD file is comprised of video data.

4. The system of claim 1, wherein said MBD file is comprised of audio data.

5. The system of claim 1, wherein said MBD file is comprised of text data.

6. The system of claim 1, further comprising a third computer networked with said second computer, said third computer comprising said MBD file.

7. The system of claim 1, wherein said KEYWORD is an HTML MBD header, said header enclosing said description of the location of said MBD file.

8. The system of claim 1, where said description of said location of said MBD file is a URL.

9. The system of claim 1, wherein said browser displays a multimedia representation of each of said multimedia bookmarks upon request by a user.

10. The system of claim 9, wherein said multimedia representation comprises graphics.

11. The system of claim 10, wherein said graphic multimedia representation is animated.

12. The system of claim 9, wherein said multimedia representation comprises text.

13. The system of claim 9, wherein said multimedia representation comprises video.

14. The system of claim 9, wherein said browser loads and displays said HTML file when a user selects said multimedia representation.

15. The system of claim 9, wherein said browser plays audio data when a user places his cursor over said multimedia representation.

16. The system of claim 9, wherein said browser plays audio data when a user selects said multimedia representation.

17. The system of claim 9, wherein said multimedia representation is a static graphic that is animated by the browser when the user places his cursor over said multimedia representation.

18. A method for providing multimedia bookmarks for hypertext markup language files, comprising the steps of:
   a. loading and displaying an HTML file with an associated URL, said HTML file comprising a KEYWORD and a description of the location of a MBD file, said description disposed in a predetermined position relative to said KEYWORD;
   b. scanning said HTML file for said KEYWORD upon the request of a user to store a bookmark and determining the location of said MBD file;
   c. storing said MBD file with said URL as a multimedia bookmark.

19. The method of claim 18, wherein said MBD file is comprised of graphic data.

20. The method of claim 18, wherein said MBD file is comprised of video data.

21. The method of claim 18, wherein said MBD file is comprised of audio data.

22. The method of claim 18, wherein said MBD file is comprised of text data.

23. The method of claim 18, further comprising a third computer networked with said second computer, said third computer comprising said MBD file.

24. The method of claim 18, wherein said KEYWORD is an HTML MBD header, said header enclosing said description of the location of said MBD file.

25. The method of claim 18, where said description of said location of said MBD file is a URL.

26. The method of claim 18, wherein said browser displays a multimedia representation of each of said multimedia bookmarks upon request by a user.

27. The method of claim 26, wherein said multimedia representation comprises graphics.

28. The method of claim 27, wherein said graphic multimedia representation is animated.

29. The method of claim 26, wherein said multmedia representation comprises text.

30. The method of claim 26, wherein said multimedia representation comprises video.

31. The method of claim 26, wherein said browser loads and displays said HTML file when a user selects said multimedia representation.

32. The method of claim 26, wherein said browser plays audio data when a user places his cursor over said multimedia representation.

33. The method of claim 26, wherein said browser plays audio data when a user selects said multimedia representation.

34. The method of claim 26, wherein said multimedia representation is a static graphic that is animated by the browser when the user places his cursor over said multimedia representation.

35. A browser for providing a bookmark for a hypertext markup language (HTML) file with a URL, said browser scanning the HTML file for a KEYWORD upon the request of a user, wherein if said browser detects said KEYWORD, said browser determines the location of at least one MBD file and stores said MBD file with said URL as a bookmark, and wherein if said KEYWORD is not detected, said browser scans said HTML file for TITLE information, and if said TITLE information is found, stores said TITLE information and URL as a bookmark.

36. A method for providing bookmarks for a hypertext markup language (HTML) file comprising the steps of scanning a HTML file that has a URL for a KEYWORD, wherein if said KEYWORD is found, determining the location of a MBD file and storing said MBD file with said URL as a bookmark, and if said KEYWORD is not found, scanning said HTML file for TITLE information, and if said TITLE information is found, storing said TITLE information and URL as a bookmark.

37. A multimedia bookmark comprising:
  a. means for loading and displaying a HTML file;
  b. means for downloading and storing multimedia bookmark data information upon a request from a user;
  c. means for deriving and displaying a multimedia bookmark representation from multimedia bookmark data information upon a request from the user;
  d. means for loading and displaying a HTML file when its multimedia bookmark representation is selected by a user.

* * * * *